C. A. MASSING.
COOKING UTENSIL.
APPLICATION FILED NOV. 25, 1918.

1,330,209.

Patented Feb. 10, 1920.

Inventor
Charles A. Massing
By N. R. Long
Attorney

UNITED STATES PATENT OFFICE.

CHARLES A. MASSING, OF MILLCREEK TOWNSHIP, ERIE COUNTY, PENNSYLVANIA, ASSIGNOR TO GRISWOLD MANUFACTURING COMPANY, OF ERIE, PENNSYLVANIA, A CORPORATION OF PENNSYLVANIA.

COOKING UTENSIL.

1,330,209.  Specification of Letters Patent.  Patented Feb. 10, 1920.

Application filed November 25, 1918. Serial No. 263,965.

*To all whom it may concern:*

Be it known that I, CHARLES A. MASSING, a citizen of the United States, residing in Millcreek township, in the county of Erie and State of Pennsylvania, have invented new and useful Improvements in Cooking Utensils, of which the following is a specification.

This invention relates to cooking utensils and consists in certain improvements in the construction thereof as will be hereinafter fully described and pointed out in the claims.

More particularly the invention relates to what is commonly called a "Dutch oven" used for roasting meats and other materials.

The invention is illustrated in the accompanying drawings as follows:—

Figure 1:
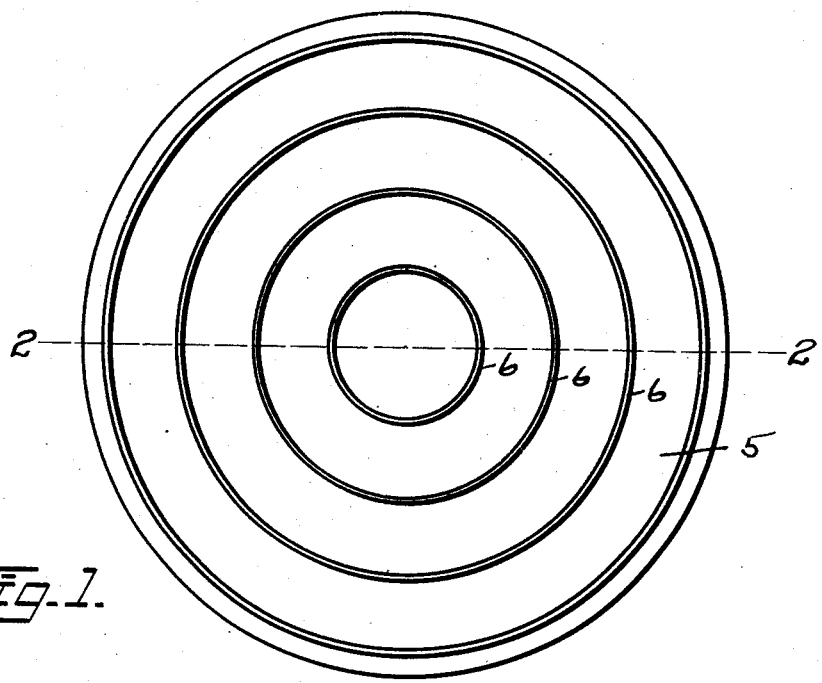

Figure 1 shows a plan view of the under side of the cover.

Figure 2:
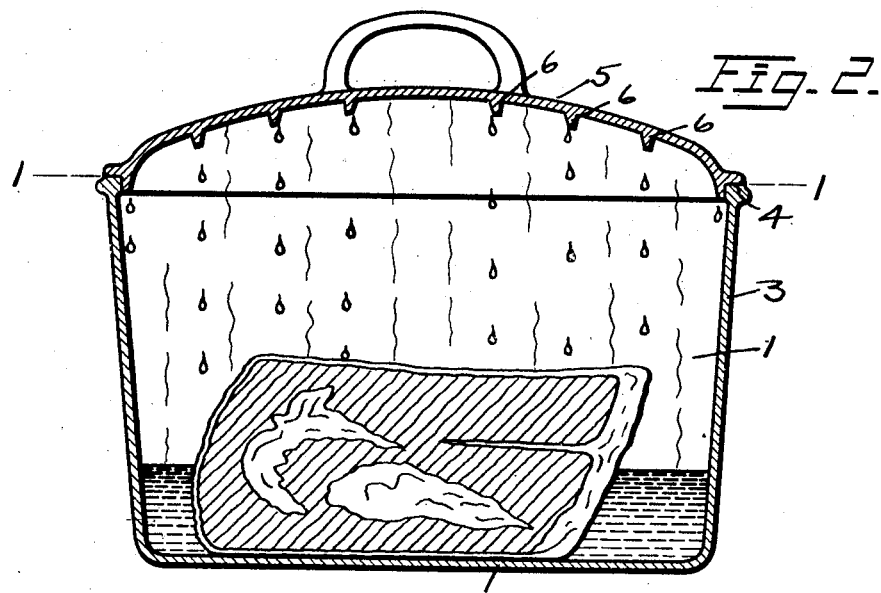

Fig. 2 a vertical central section of the utensil, the section passing through the cover on the line 2—2 of Fig. 1.

1 marks the receptacle. This has a bottom 2 and side 3. The top edge of the sides of the receptacle have a machined joint 4 which forms a comparatively close fit with the edge of the cover 5, which is preferably similarly machined. The cover 5 has a concave under surface and a series of obstructions 6 are provided on this surface so that the vapors which are condensed on the under side of the cover are distributed throughout the receptacle. This is accomplished by reason of the fact that when the liquids condensed move along the under side of the cover and reach an obstruction 6 they drop from this obstruction into the receptacle and as these obstructions are distributed throughout the cover the drip is distributed thus giving uniform results as to the material being cooked. The ribs, or obstructions 6 are preferably in the form of annular ribs as shown. There is a further advantage in a structure in which steam is exhausted through the lifting of the cover at the edge particularly in connection with a cover having a concave under surface. With such a structure without the ribs the condensation follows down the under surface of the cover, reaches the joint and is driven with the escaping steam through the joint so as to discharge a considerable portion of the condensate through the joint with the consequent loss of fluids and the inconvenience attending such discharge.

What I claim as new is:—

1. A cooking utensil comprising a receptacle; and a closely fitting cover for the receptacle free to lift to permit the escape of steam at the edge of the cover, said cover being concaved on its under surface and having a series of drip obstructions on said concave surface adapted to distribute the drip from the cover into the receptacle and to prevent the flow of the condensates from the central part of the cover and through the joint to the joint formed with the receptacle at the edge of the cover when the cover is lifted through the accumulation of steam pressure.

2. A cooking utensil comprising a receptacle; and a closely fitting cover forming a tight joint with the edge of the receptacle but free to lift to permit the escape of steam on the accumulation of pressure in the receptacle, the cover having a concaved under surface and having drip obstructions on said under surface adapted to distribute the drip from the cover into the receptacle and to prevent the flow of the condensate from the central part of the cover to the joint and through the joint formed with the receptacle at the edge of the cover when the cover is lifted through the accumulation of steam pressure.

3. A cooking utensil comprising a receptacle; and a closely fitting cover for the receptacle free to lift to permit the escape of steam at the edge of the cover, said cover being concaved on its under surface and having a drip obstruction preventing the flow of the major portion of the drip to the joint at the edge of the cover to prevent the flow of the condensates from the central part of the cover to the joint and through the joint formed with the receptacle at the edge of the cover when the cover is lifted through the accumulation of steam pressure.

In testimony whereof I have hereunto set my hand.

CHARLES A. MASSING.